(12) United States Patent
Sharma (10) Patent No.: US 11,962,603 B2
(45) Date of Patent: *Apr. 16, 2024

(54) ENHANCEMENT TO THE IS-IS PROTOCOL FOR ELIMINATING UNWANTED NETWORK TRAFFIC

(71) Applicant: Ciena Corporation, Hanover, MD (US)

(72) Inventor: Navjot Sharma, Shimla (IN)

(73) Assignee: Ciena Corporation, Hanover, MD (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/489,104

(22) Filed: Sep. 29, 2021

(65) Prior Publication Data

US 2022/0021685 A1 Jan. 20, 2022

Related U.S. Application Data

(63) Continuation of application No. 16/412,549, filed on May 15, 2019, now Pat. No. 11,252,162.

(30) Foreign Application Priority Data

Apr. 2, 2019 (IN) .............................. 201911013288

(51) Int. Cl.
*H04L 29/06* (2006.01)
*H04L 9/40* (2022.01)
*H04L 12/18* (2006.01)
*G06F 16/22* (2019.01)

(52) U.S. Cl.
CPC ........ *H04L 63/123* (2013.01); *H04L 12/1886* (2013.01); *H04L 63/083* (2013.01); *H04L 63/0876* (2013.01); *H04L 63/105* (2013.01); *G06F 16/22* (2019.01)

(58) Field of Classification Search
CPC . H04L 63/105; H04L 63/083; H04L 63/0876; H04L 63/123; H04L 12/1886; G06F 16/22; H04W 12/102
See application file for complete search history.

(56) References Cited

U.S. PATENT DOCUMENTS

| 2010/0020719 | A1* | 1/2010 | Chu ........................ H04L 41/12 370/254 |
| 2019/0097922 | A1* | 3/2019 | Chakraborty ........... H04L 45/44 |
| 2019/0312804 | A1* | 10/2019 | Yang ....................... H04L 45/00 |

FOREIGN PATENT DOCUMENTS

| CN | 107948065 A | * | 4/2018 | ............. H04L 45/04 |
| CN | 107948065 A | | 4/2018 | |
| EP | 3319286 A1 | * | 5/2018 | ............. H04L 29/04 |

* cited by examiner

*Primary Examiner* — Tri M Tran
(74) *Attorney, Agent, or Firm* — Clements Bernard Walker; Christopher L. Bernard (57) ABSTRACT

Systems and methods for enhancing a routing protocol of a telecommunications network are provided. In one embodiment, a method for enhancing the Intermediate System to Intermediate System (IS-IS) routing protocol is provided. The method includes receiving a packet from a first peer device on a network; determining whether a mismatch exists in an authentication of the packet from the first peer device; and responsive to an authentication mismatch, sending a flush instruction to a plurality of peer devices on the network to remove any link state packets from the first peer device. The plurality of peer devices are configured to remove all link state packets from the first peer device regardless of a type of authentication and a type of mismatch.

17 Claims, 4 Drawing Sheets

ENHANCEMENT TO THE IS-IS PROTOCOL FOR ELIMINATING UNWANTED NETWORK TRAFFIC

CROSS-REFERENCE

The present disclosure is a continuation of U.S. patent application Ser. No. 16/412,549, filed May 15, 2019, the contents of which are incorporated by reference herein.

TECHNICAL FIELD

The present disclosure generally relates to networking systems and methods. More particularly, the present disclosure relates to systems and methods for enhancing authentication procedures of the Intermediate System to Intermediate System (IS-IS) routing protocol to eliminate unwanted traffic in a telecommunications network.

BACKGROUND

Intermediate System to Intermediate System (IS-IS) is a protocol among many routing protocols that can be used in a telecommunications network. The IS-IS protocol supports the sharing of routing information among a plurality of nodes so that each node on the network can know the routing paths between any two nodes in the network. In order to enable the exchange of routing information, the nodes may include various levels of authentication passwords. If a node is improperly configured with an incorrect password with respect to one level of authentication, the node will not be authenticated on that level. A password mismatch or misconfiguration may result in routing information being dropped.

The IS-IS protocol includes a configurable setting that defines a length of time that unauthenticated packets are stored until they are eventually discarded or dropped. This lifetime expiration may range from a short amount of time (e.g., seconds) to a long time (e.g., several minutes). Thus, because of the lifetime expiration setting, useless Link State Protocol data units (LSPs) for routing the packets may be stored, thereby causing the unwanted routing or sharing of these unauthenticated packets among the nodes for a long time, thereby creating unwanted traffic.

Therefore, there is a need to eliminate these unneeded LSPs from a telecommunications network utilizing IS-IS in a timely manner, thereby preventing the unnecessary allocation of bandwidth for routing information within the network.

BRIEF SUMMARY

Systems and methods for immediately discarding unauthenticated IS-IS LSPs from a telecommunications network are described in the present disclosure. According to one embodiment, a non-transitory computer-readable medium is configured for storing a program that is executable by a processing device. The program enables the processing device to receive a packet from a first peer device on a network and determine if a mismatch exists in an authentication of the packet from the first peer device. If an authentication mismatch exists, the program is further configured to enable the processing device to multicast a flush instruction to a plurality of peer devices on the network to instruct the plurality of peer devices to immediately discard the packet.

According to another embodiment, a method for enhancing the Intermediate System to Intermediate System (IS-IS) routing protocol is described in the present disclosure. The method may include the steps of determining if a password on a received Link State Protocol data unit (LSP) is authenticated and determining if the LSP is generated by an authenticated node. If the LSP password is not authenticated or the LSP is not generated by an authenticated node, the method may include the step of setting a lifetime expiration timer of the LSP to zero.

According to yet another embodiment, a node of a telecommunications network is provided. In this embodiment, the node includes a processing device and a memory configured to store a flush timer, an Intermediate System to Intermediate System (IS-IS) routing protocol, and an IS-IS add-on program. The node further includes a database configured to store one or more packets. The IS-IS add-on program may be configured to enable the processing device to alter the remaining time of the flush timer to enact an immediate elimination of an unauthenticated routing instruction packet from the database

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

The present disclosure relates to systems and methods for eliminating unwanted traffic in a telecommunications network. More particularly, in a telecommunications network utilizing routing protocol (e.g., link state routing protocol, distance vector routing protocol, etc.), such as the Intermediate System to Intermediate System (IS-IS) protocol, routing information may be kept in the network for several minutes, even routing information that is determined to be non-essential. As described in the present disclosure, systems and methods are provided for immediately eliminating unwanted routing information. By immediately eliminating this unwanted traffic, the present disclosure provides an improvement over the conventional IS-IS protocol whereby bandwidth is not unnecessarily allocated for the unwanted traffic.

Figure 1:
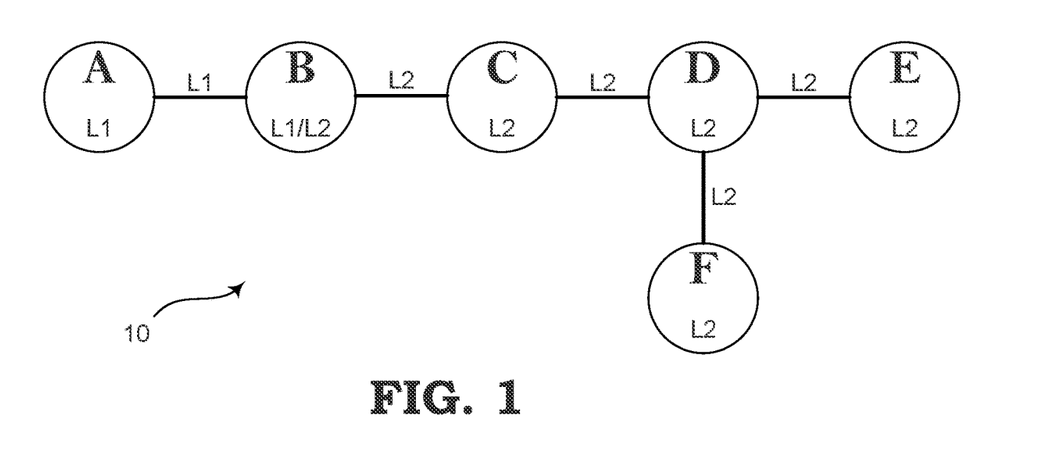
FIG. 1 is a diagram showing a group of nodes of a telecommunications network, according to various embodiments.

FIG. 1 is a diagram illustrating a representation of a portion of a telecommunications network 10. In this embodiment, the portion of the telecommunications network 10 includes a plurality of nodes configured to communicate with each other using a link state routing protocol. More particularly, the nodes may be configured to utilize the IS-IS routing protocol. The IS-IS protocol enables the sharing or exchanging of certain information between nodes and updates the routing information of each node among the other nodes.

As shown in FIG. 1, the network 10 includes Node A, Node B, Node C, Node D, Node E, and Node F. Nodes A, B, C, D, E, and F may be configured as routers, switches, L3 switches, or other processing components. According to the IS-IS protocol, the Nodes A, B, C, D, E, F may operate on one or more levels, such as Level 1 (L1), Level 2 (L2), or Level 1/Level 2 (L1/L2). Nodes within the same level can communicate routing information with each other, and L1/L2 nodes can communicate with either L1 or L2 nodes. In this example, Node A is an L1 node and is configured to communicate with adjacent Node B. Nodes C, D, E, and F are L2 nodes and are configured to communicate with adjacent nodes also on L2. Node B, configured as an L1/L2 node, may communicate with Node A on Level 1 and may communicate with Node C on Level 2. According to the example shown in FIG. 1, Nodes E and F may be customer nodes and Nodes A, B, C, and D may be part of a service provider or other server system.

The nodes are configured to share packets or Protocol Data Units (PDUs), which may include data and routing information. To establish adjacencies with other Nodes within the IS-IS network 10, the Nodes may transmit IS-IS multicast packets (e.g., Hello packets (IIHs), LSPs, etc.) to discover adjacent neighbors on a link. The IIHs are maintained on the nodes to maintain or keep alive the adjacencies or neighborships. The neighborship between Nodes A and B are maintained by L1 IIHs. Other neighborships are maintain between adjacent pairs of the Nodes B, C, D, E, and F by L2 IIHs.

Using the IS-IS protocol, nodes can also multicast Link State PDUs (LSPs) for distributing routing information with other peer nodes. LSPs include routing information for defining the path between any two nodes within the network 10. Also, nodes can multicast Sequence Number PDUs (SNPs), which are packets that control the distribution of the LSPs for synchronizing databases within the network 10.

As a routing protocol, IS-IS uses various levels of authentication to enable the sharing of packets. Authentication in this respect refers to the monitoring of a node's password of a certain level to determine if the password matches the same level password of a neighbor node. If there is a match, the two nodes are configured to exchange routing information on that level.

For example, a first type of authentication is "interface authentication." Interface authentication relates to sharing hello packets (i.e., IIHs). If an authentication password is matched between two peer devices, interface authentication is enabled in order that the nodes can discover their adjacencies or neighborships. For instance, if the authentication of Nodes A and B are matched, these nodes will be able to discover that they are related to each other as adjacencies. By establishing interface authentication, the nodes (e.g., Nodes A and B) may be considered to share a neighborship with each other. If the authentication passwords in the interface authentication are not matched, the adjacencies or neighborships in the network 10 will not be established.

IS-IS also supports "area authentication," which refers to authentication between Level 1 (L1) nodes. When configured, matching passwords of L1 packets are authenticated. If area authentication is not matched, the L1 LSPs and SNPs are discarded. In this situation, however, there is no impact on IS-IS neighborships. As such, adjacent neighbors may still maintain their neighborships, but they will not be able to communicate LSPs and SNPs on L1. In the embodiment shown in FIG. 1, Nodes A and B may have matching area authentication passwords, thereby allowing Nodes A and B to exchange routing information with each other on Level 1.

Furthermore, IS-IS supports "domain authentication," which refers to authentication between Level 2 (L2) nodes. When configured, matching passwords of L2 packets are authenticated. If domain authentication is not matched, the L2 LSPs and SNPs are discarded. Again, like area authentication, there is no impact on IS-IS neighborships if there is a mismatch in the domain authentication. Based on the example of FIG. 1, domain authentication may be configured on all nodes except Node A, which acts as a L1 node. An administrator may configure the same password for domain authentication on each of Nodes B, C, D, E, and F. As Nodes B to F are in the same L2 domain with the same domain authentication password, there is reachability between all nodes. Furthermore, the administrator or other user may utilize an IS-IS password command to set one or more passwords used for authentication at any level for interface authentication, area authentication, and/or domain authentication.

Network traffic in the example of FIG. 1 may include packets having header information and data. The header information may include the routing information according to IS-IS or other suitable routing protocol, as described in the present disclosure. Each of Nodes E and F may be a customer node that is connected directly to Node D as an adjacent neighbor and may independently receive packets directly from Node D.

During initialization, the routing information for each node is shared with each of the other nodes in the network 10. This routing information may be stored in a database, such as an LSP database or Link State Data Base (LSDB). In normal operation, when all nodes are authenticated, traffic may continuously flow from Node A to Node E and may continuously flow from Node A to Node F, depending on the intended recipient. This traffic is routed through Nodes B, C, and D.

In some situations, there may be an authentication mismatch (e.g., when authentication passwords for area authentication or domain authentication do not match). This may be the result of a misconfiguration or an intentional password change in a node. With a mismatch in area or domain authentication, the packets (e.g., LSPs, SNPs) from an unmatched node are discarded.

However, according to typical IS-IS operation, the discarded packets are typically not discarded immediately, but remain in the network 10 for a certain length of time. For instance, IS-IS allows a user to set a "remaining lifetime" or "lifetime expiration," which may be defined as a length of time that the unauthenticated packets may remain in the databases (i.e., LSDBs) of the various Nodes A, B, C, D, E, F before they are completely eliminated from the network 10. Thus, these unwanted packets can create unnecessary traffic that may tend to slow down the sharing operations of essential communications.

However, according to the embodiments of the present disclosure, the IS-IS protocol can be enhanced to flush the network 10 of unwanted packets. One way that the embodiments of the present disclosure are configured to flush the unwanted traffic is by deliberately changing the lifetime expiration of these unwanted packets to zero seconds, thereby immediately prompting the elimination of these packets.

At times, users may change an authentication password to intentionally create a mismatch in either the area authentication or domain authentication. This may be done so that a node only receives L1 or L2 packets. For example, if the area authentication password is changed at Node F to create a mismatch for L1 communication, LSPs and SNPs from Node A are blocked at Node B. If the domain authentication password is changed at Node F to create a mismatch for L2 communication, LSPs and SNPs are blocked at Node D. However, traffic from Node A to Node F may already exist in the network 10. In this case, the discarded packets remain in the network 10 until the set lifetime of the packets expire. Based on the teachings of the present disclosure, however, the unwanted traffic can be immediately flushed from the system without waiting the entire lifetime period.

In the example of FIG. 1, Node A is acting as a pure L1 device and Node B is acting as a L1/L2 device. A default route is leaked from Node B to Node A, so any traffic destined towards Nodes E and F will pass through Node B. An administrator may want to halt traffic to Node F, but may still want to maintain the IS-IS neighborship between Nodes D and F. To achieve this, the administrator may change the domain authentication password on node F, so that L2 LSPs are discarded on Node D. Also, IP traffic that is already flowing from Node A towards Node F can be stopped. Even though LSPs of Node F may be rejected by Node D because of the mismatch, old LSPs may still be present on Nodes B, C, and D and the traffic associated with these LSPs may still be running.

The problem is that even though the LSPs coming from Node F are discarded on Node D, the previously shared LSPs may be present in Nodes B and C. These LSPs remain in the LSP database (i.e., LSDB) until the remaining lifetime expires. At the end of the lifetime expiration, the LSP can be removed from the LSDB. Therefore, even when an administrator tries to halt the routing information between Nodes D and F by changing the password, the conventional IS-IS protocol does not include sharing the blocking information with peer nodes in the network 10 and the peer nodes will therefore keep the unwanted LSPs in the LSDB, causing unnecessary network traffic.

In contrast to the conventional protocol, IS-IS can be enhanced as described in the present disclosure to flush this unwanted traffic. The embodiments of software for enhancing IS-IS can immediately update the peer devices to instruct the peer devices to flush the unauthenticated LSPs and avoid a scenario of network traffic that may negatively affect the speed and reliability of the transfer of packets throughout the network 10.

According to the above example, a mismatch in one of the authentication passwords of Node F may exist. The present disclosure provides a supplemental program that may run on top of the IS-IS protocol to handle the elimination of unwanted traffic in this case. For example, the program may include storing an identification (e.g., system_ID) of the unauthenticated node (e.g., Node F) in a database (e.g., an auth_LSP_cleanup database), which may be different from the LSDB on each node.

The program may further search the LSP generated by the identification and set the remaining lifetime to zero. Also, a checksum may also be set to zero for confirming the change in the lifetime value. The program can also flood the other nodes by sending a multicast instruction to instruct the other nodes to perform the same zeroing process. Thus, with the lifetimes of each occurrence of the unauthenticated LSPs on each node being set to expire immediately, a database manager can remove the unwanted LSPs from the respective LSDBs.

Therefore, the routes to Node F defined in the LSPs and SNPs will be removed, and any pending traffic intended for Node F will be dropped. If necessary, other paths may be defined to avoid passing traffic through Node F, although the example of FIG. 1 does not include Node F as an intermediate node.

Figure 2:
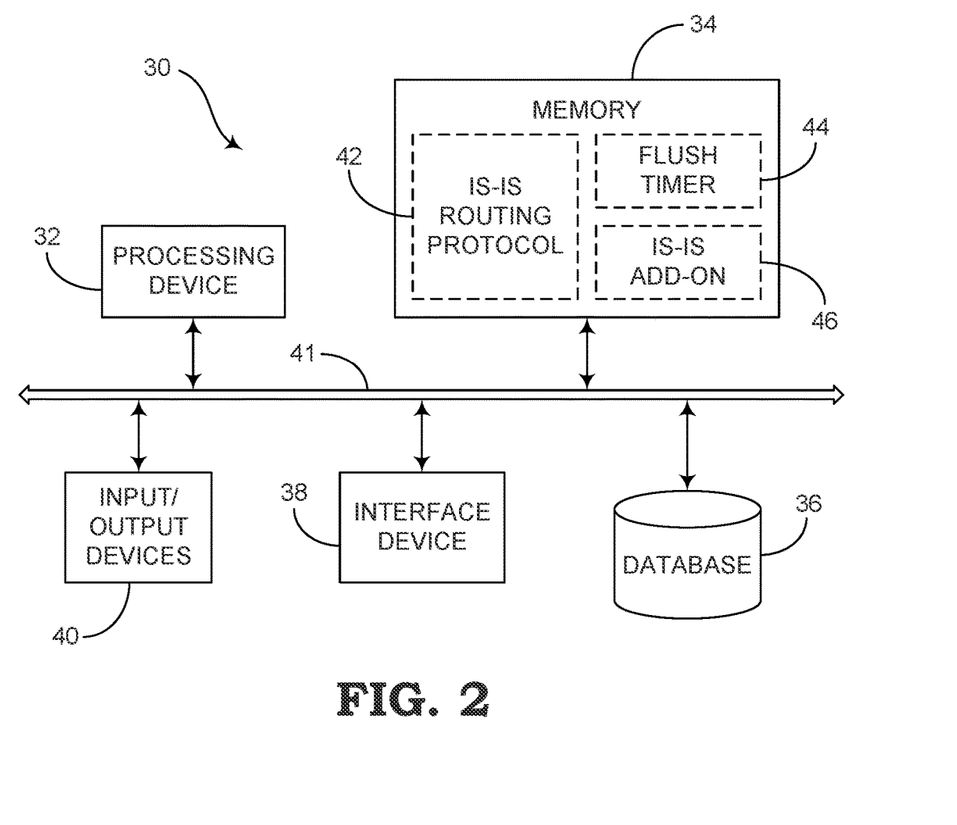
FIG. 2 is a block diagram showing one of the nodes of the telecommunications network of FIG. 1, according to various embodiments.

FIG. 2 is a block diagram illustrating an embodiment of a node 30 of a telecommunications network. For example, the node 30 may represent any one of the Nodes A, B, C, D, E, F shown in FIG. 1 or any other node within an IS-IS network. In this embodiment, the node 30 may include a processing device 32, a memory 34, a database 36, an interfacing device 38, and input/output (I/O) interface devices 40. The components 30, 32, 34, 36, 38, and 40 shown in FIG. 2 may be interconnected with each other via a local interface 41. The interfacing device 38 may be configured for communicating with one or more adjacent neighbor devices (i.e., other nodes shown in FIG. 1). For example, according to the configuration shown in FIG. 1, Node A include only one immediate neighbor (i.e., Node B), Nodes B and C include two immediate neighbors, and Node D include three immediate neighbors (i.e., Nodes C, E, F).

The memory 34 of the node 30 of FIG. 2 may include an IS-IS routing protocol 42 stored therein. Also, according to the various embodiments of the present disclosure, the memory 34 further includes a flush timer 44 and an IS-IS add-on 46. The flush timer 44 is configured to assign a predefined time that an unauthenticated packet may remain in the database 36 before it is flushed from the database 36. The flush timer 44 may have a default of 60 seconds. However, some systems may typically have a default setting of 1200 seconds (i.e., 20 minutes) or other times. The flush timer 44 can be set at any value between 0 and 65535 seconds.

The IS-IS add-on 46 is an enhancement to the conventional IS-IS routing protocol 42 and may be enabled or disabled on node 30 as needed. According to some embodiments, the IS-IS add-on 46 may be enabled or disabled in conjunction with the enabling/disabling on each of the other nodes in a particular telecommunications network (e.g., network 10) or any suitable portion of a network. When enabled, the IS-IS add-on 46 allows the node 30 to flush the database (e.g., LSDB) 36 of unwanted LSPs and instructs other enabled nodes to do the same.

The IS-IS add-on 46 may simply be added software code or an additional program that runs with the conventional IS-IS routing protocol 42. The IS-IS add-on 46 does not require any change in the existing IS-IS routing protocol 42 or its handling. The IS-IS add-on 46 can work seamlessly with IS-IS and can operate with other computers, servers, routers, switches, or other processing devices on the network.

According to various embodiments, the processing device 32 may include one or more generic or specialized processors, such as microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), or other suitable logic processing components. The memory 34 may be configured to store program instructions (including software and/or firmware). The processing device 32 may be configured to execute the program instructions alone or in conjunction with certain non-processor circuits to thereby perform at least some of the functions of the methods and/or systems described herein.

Alternatively, some or all functions or processes of the methods may be implemented by a state machine that has no stored program instructions or by one or more Application Specific Integrated Circuits (ASICs), in which each function or some combinations of certain of the functions are implemented as custom logic or circuitry. For some of the embodiments described herein, a corresponding device configured in hardware and/or software/firmware can be referred to as circuitry or logic configured to or adapted to perform a set of operations, steps, methods, processes, algorithms, functions, techniques, etc. on digital and/or analog signals as described herein for the various embodiments.

The memory 34 may include any types of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 34 may incorporate electronic, magnetic, optical, and/or other types of storage media. The memory 34 may have a distributed architecture, where various components are situated remotely from one another, but can be accessed by the processor 32. The memory 34 may include non-transitory computer-readable storage media for storing one or more software programs. The software in memory 34 may include one or more software programs, each of which may include an ordered listing of executable instructions for implementing logical functions. The software in the memory 34 may further include a suitable operating system (O/S). The operating system may essentially control the execution of other computer programs and provide scheduling, input/output control, file and data management, memory management, communication control, and other related services. The one or more programs may be configured to implement the various processes, algorithms, methods, techniques, etc. described herein.

The memory 34 may further include a data store (e.g., database 36) for storing data. The data store or database 36 may include any types of volatile memory elements (e.g., RAM, DRAM, SRAM, SDRAM, etc.), nonvolatile memory elements (e.g., ROM, hard drive, tape, CDROM, etc.), and combinations thereof. Moreover, the database 36 may incorporate electronic, magnetic, optical, and/or other types of storage media. In one example, the database 36 may be an internal hard drive connected to the local interface 41. Additionally, in another embodiment, the database 36 may be located external to the node 30, such as, for example, an external hard drive connected to I/O interface devices 40 (e.g., SCSI or USB connection). In a further embodiment, the data store or database 36 may be connected to the node 30 through a network, such as, for example, the telecommunications network 10.

The input/output (I/O) devices 40 or interfaces of the node 30 may be used to receive user input from and/or for providing system output to one or more devices or components. User input may be provided via, for example, a keyboard, touchpad, a mouse, or other suitable input device. System output may be provided via a display device, a printer, or other suitable output device. The I/O interface devices may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, a universal serial bus (USB) interface, and/or other suitable components.

The local interface 41 or bus interface may be, for example, but not limited to, one or more buses or other wired or wireless connections, as is known in the art. The local interface 41 may have additional elements, which are omitted for simplicity, such as controllers, buffers (caches), drivers, repeaters, and receivers, among many others, to enable communications. Further, the local interface 41 may include address, control, and/or data connections to enable appropriate communications among the aforementioned components.

The interface device 38 or network interface may be used to enable the node 30 to communicate over a network, such as the telecommunications network 10, the Internet or other Wide Area Network (WAN), local area network (LAN), or other type of network. The network interface device 38 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface device 38 may include address, control, and/or data connections to enable appropriate communications on the network.

Moreover, some embodiments may be implemented such that the memory 34 includes a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software and/or firmware can include instructions executable by a processor (e.g., processing device 32) or any suitable type of device, programmable circuitry, or logic. In response to such execution, the software/firmware may cause the processor (e.g., processing device 32) to perform a set of operations, steps, methods, processes, algorithms, functions, techniques, etc. as described herein for the various embodiments.

Figure 3:
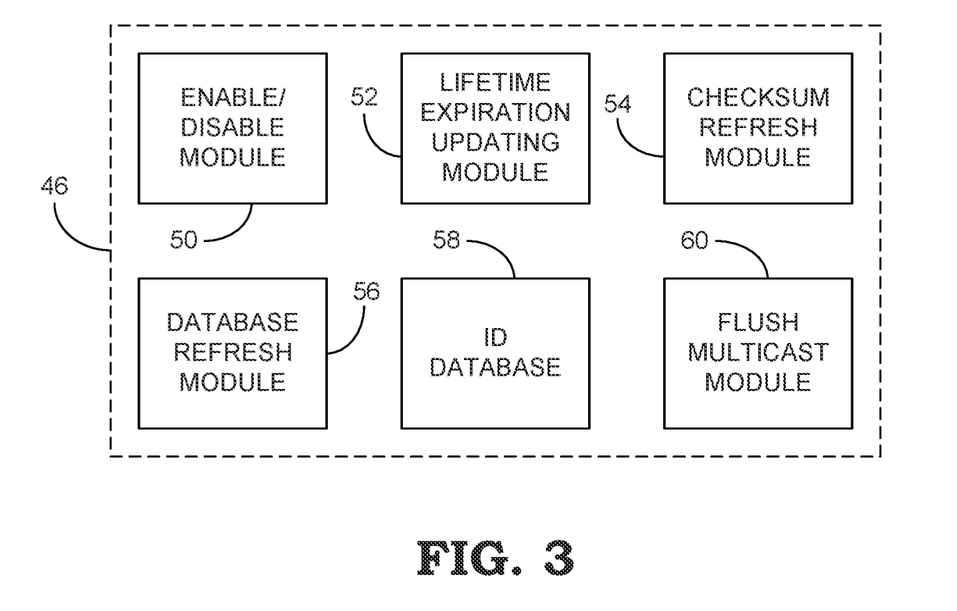
FIG. 3 is a block diagram showing the IS-IS add-on program shown in FIG. 2, according to various embodiments.

FIG. 3 is a block diagram illustrating an embodiment of the IS-IS add-on program 46 shown in FIG. 2. In this embodiment, the IS-IS add-on 46 may include an enable/disable module 50, a lifetime expiration updating module 52, a checksum refresh module 54, a database refresh module 56, an ID database 58, and a flush multicast module 60. The enable/disable module 50 is configured to enable a user to enable or disable the unwanted traffic flushing feature of the IS-IS add-on 46 to thereby enhance the handling of unauthenticated LSPs. The enable/disable module 50 may include a default of "disable" until a user enables the feature.

If the IS-IS add-on 46 is enabled, the lifetime expiration updating module 52 is configured to update the flush timer 44 regarding the lifetime expiration of unwanted LSPs as needed. Regardless of the remaining time for these unwanted LSPs, the lifetime expiration updating module 52 sets the value to zero, which prompts the flush timer 44 to flush the database 36 of the unwanted LSPs. Also, the checksum refresh module 54 may be configured to set a checksum value associated with the lifetime expiration to zero, thus allowing the lifetime of the unwanted LSPs to register as expired. The IS-IS add-on 46 further includes the database refresh module 56, which may be configured to refresh the database 36 of unwanted LSPs.

In addition, the IS-IS add-on 46 includes the ID database 58, which may be configured to store the IDs of LSPs and/or nodes that are unauthenticated. Thus, any node that is detected as being unauthenticated can be identified, such that any pending and/or future LSPs or SNPs associated with that node can be immediately discarded. When the node is returned to an authenticated state (e.g., when the authentication password is set to match the peer passwords), the ID database 58 can then be updated with ID information that indicates that packets associated with the node will be handled as usual.

The flush multicast module 60 is configured to enable the interface device 38 to communicate with other peer nodes to share updated information regarding which nodes and/or packets are authenticated or unauthenticated. This information can then be used by the other nodes to synchronize the databases (e.g., LSDB 36, ID database 58, etc.) of the various nodes, flush unwanted LSPs to eliminate unwanted traffic, share ID information of authenticated and unauthenticated nodes and packets, etc.

Referring again to FIG. 1, if an authentication mismatch is detected on Node D, the LSP flush instruction is flooded (i.e., multicast) to the other nodes and the LSPs are flushed from these nodes as well. Thus, traffic that is held in Node B can be dropped for packets intended for Node F even without waiting for the full expiration time.

Therefore, according to the above description, the IS-IS add-on program 46 may be stored on a non-transitory computer-readable medium and may be executable by a processing device (e.g., processing device 32). The IS-IS add-on program 46 may enable the processing device 32 to receive a packet from a first peer device on a network. The program 46 may also determine if a mismatch exists in an authentication of the packet from the first peer device. If an authentication mismatch exists, the IS-IS add-on program 46 may be configured to multicast a flush instruction to a plurality of peer devices on the network to instruct the plurality of peer devices to immediately discard the packet.

Regarding the IS-IS add-on program 46 mentioned above, the packet may be a Protocol Data Unit (PDU) to be shared in a packet-switched network. For instance, the PDU may be a Link State PDU (LSP).

The IS-IS add-on program 46 stored on the non-transitory computer-readable medium may further enable the processing device 32 to determine the mismatch by analyzing a password of the packet to determine if the password matches a set password shared by the plurality of peer devices. Additionally, the non-transitory computer-readable medium may be configured such that the IS-IS add-on program 46 may enable the processing device 32 to instruct the plurality of peer devices to immediately discard the packet by resetting a lifetime expiration of the packet to zero, thereby resulting in the immediate discarding of the packet.

If the above-mentioned authentication mismatch exists, the IS-IS add-on program 46 further enables the processing device 32 to multicast a blocking instruction to the plurality of peer devices on the network to block one or more existing packets associated with the first peer device. If the authentication mismatch exists, the program 46 further enables the processing device 32 to instruct the plurality of peer devices to block future packets destined for the first peer device. Authentication may include an area authentication on Level 1 and/or a domain authentication on Level 2. The IS-IS add-on program 46 may be configured to run on top of the regular IS-IS routing protocol 42.

Figure 4:
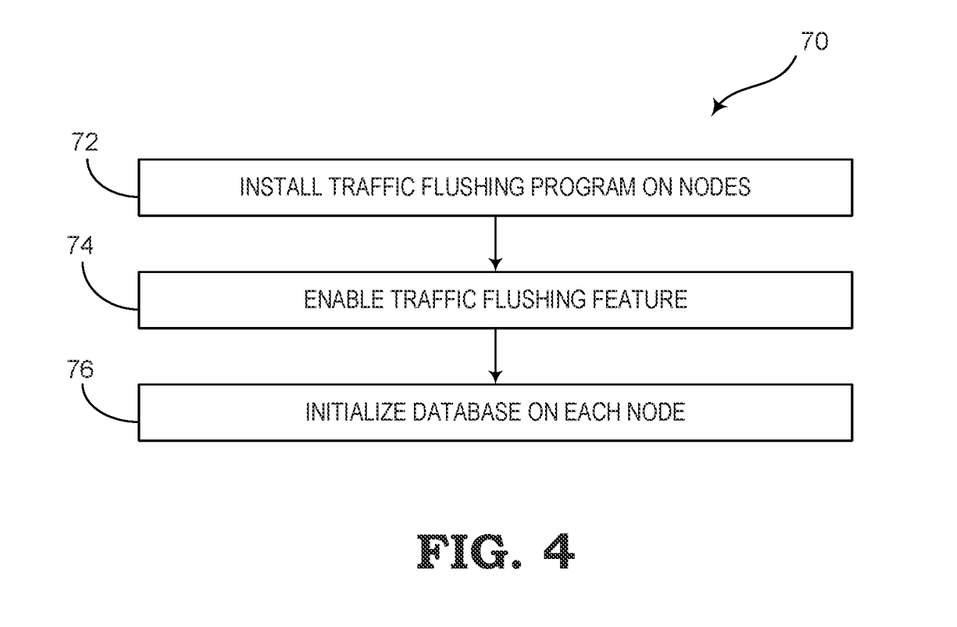
FIG. 4 is a flow diagram showing a method for initializing the IS-IS add-on program of FIG. 3, according to various embodiments.

FIG. 4 is a flow diagram illustrating an embodiment of a method 70 for configuring a node with the capability of flushing unwanted network traffic. In this embodiment, the method 70 includes block 72, which indicates a first step of installing an IS-IS add-on feature (e.g., IS-IS add-on program 46 shown in FIG. 2) on top of the conventional IS-IS routing protocol 42 in a node of a telecommunication network. As indicated in block 74, the method 70 includes enabling the IS-IS add-on feature for flushing unwanted traffic. As indicated in block 76, one or more databases (e.g., LSDB 36, ID database, etc.) may be initialized to reset the IDs of authenticated and/or unauthenticated nodes. When the method 70 is executed, the node is equipped to flush unwanted network traffic according to the embodiments of the present disclosure.

Figure 5:
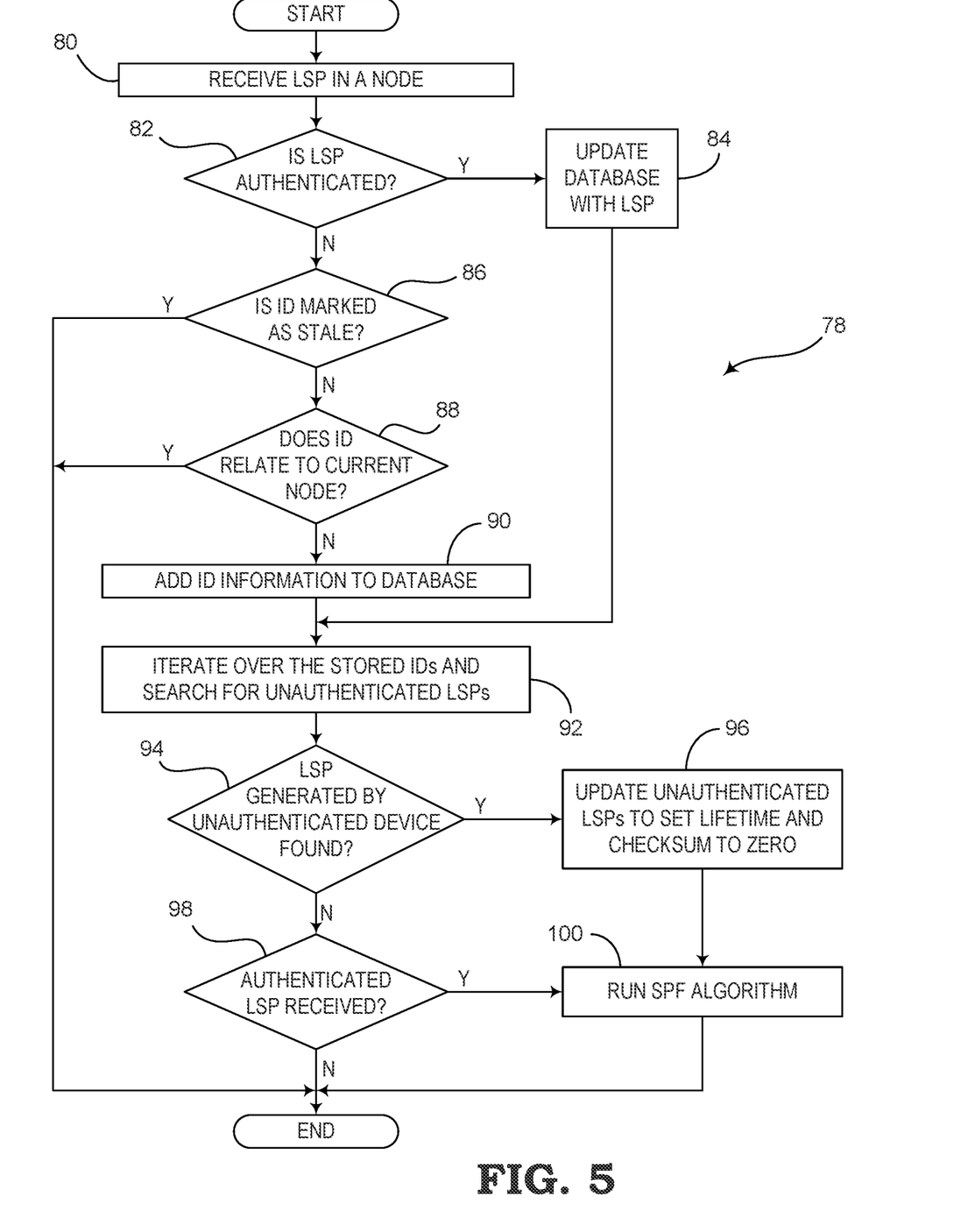
FIG. 5 is a flow diagram showing a method for executing the IS-IS add-on program of FIG. 3, according to various embodiments.

FIG. 5 is another flow diagram illustrating an embodiment of a method 78 for executing the IS-IS add-on feature to flush unwanted traffic in a telecommunications network. The method 78 includes block 80, which indicates the step of receiving an LSP in a node of the network. A decision diamond 82 includes determining whether the received LSP is authenticated. If it is authenticated, then the method 78 proceeds to block 84, which indicates that an LSP database (LSDB) is updated with this LSP. Thereafter, the method jumps ahead to block 92.

However, if it is determined in decision diamond 82 that the LSP is not authenticated (i.e., unauthenticated or mismatched), then the method 78 proceeds to decision diamond 86. Decision diamond 86 includes analyzing an identification of a source node and/or destination node associated with the LSP to determine whether the identification has been marked as stale. In other words, it is determined whether the LSP has already expired. If so, the method 78 ends. Otherwise, if the identification is not stale, the method proceeds to decision diamond 88. As indicated in decision diamond 88, the method 78 determines if the identification corresponds to the present or current node. If so, the method 78 ends.

Otherwise, if the identification points to another node on the network, the method 78 proceeds to block 90. As indicated in block 90, the identification information of the node associated with the received LSP is added to a database (e.g., ID database 58). In some embodiments, the database may be an LSP flush database. The method then proceeds to block 92. As indicated in block 92, the method 78 of executing the IS-IS add-on feature includes the step of iterating over all the stored identification information (newly added and previously added) stored in the LSP flush database and searching for unauthenticated LSPs. Searching for unauthenticated LSPs may include checking LSPs in the LSDB advertised by any of the identifications.

Then, the method 78 includes determining whether one or more LSPs generated by unauthenticated devices can be found in the database (i.e., LSDB). If LSPs generated by unauthenticated devices are found in the database, the method 78 proceeds to block 96. If not, the method 78 proceeds to decision diamond 98. In decision diamond 98, the method 78 includes determining whether an authenticated LSP has been received. If so, the method 78 proceeds to block 100 and a Shortest Path First (SPF) algorithm is run. If not, the method 78 ends.

If any LSPs are found with matching identification (e.g., system_ID) in the LSDB according to decision diamond 94, the method 78 may further include the step of updating unauthenticated LSPs, such as by setting the remaining lifetime and checksum values to zero for all those LSPs. After this change, the method may include adding the LSPs to the LSDB and flooding the same LSPs to peer devices, so that they can remove them from their databases. Thus, the LSPs that were found to be unauthenticated can be updated such that the remaining life and the checksum are set to zero. This step also includes flooding the network with instructions to perform the same zero resetting action on the other nodes. The method 78 then includes the step of running an SPF algorithm, as indicated in block 100. The SPF algorithm can be used to calculate a best routing path to all destination nodes based on the routing information in the respective LSDBs. After running the SPF algorithm, the method 78 ends.

Figure 6:
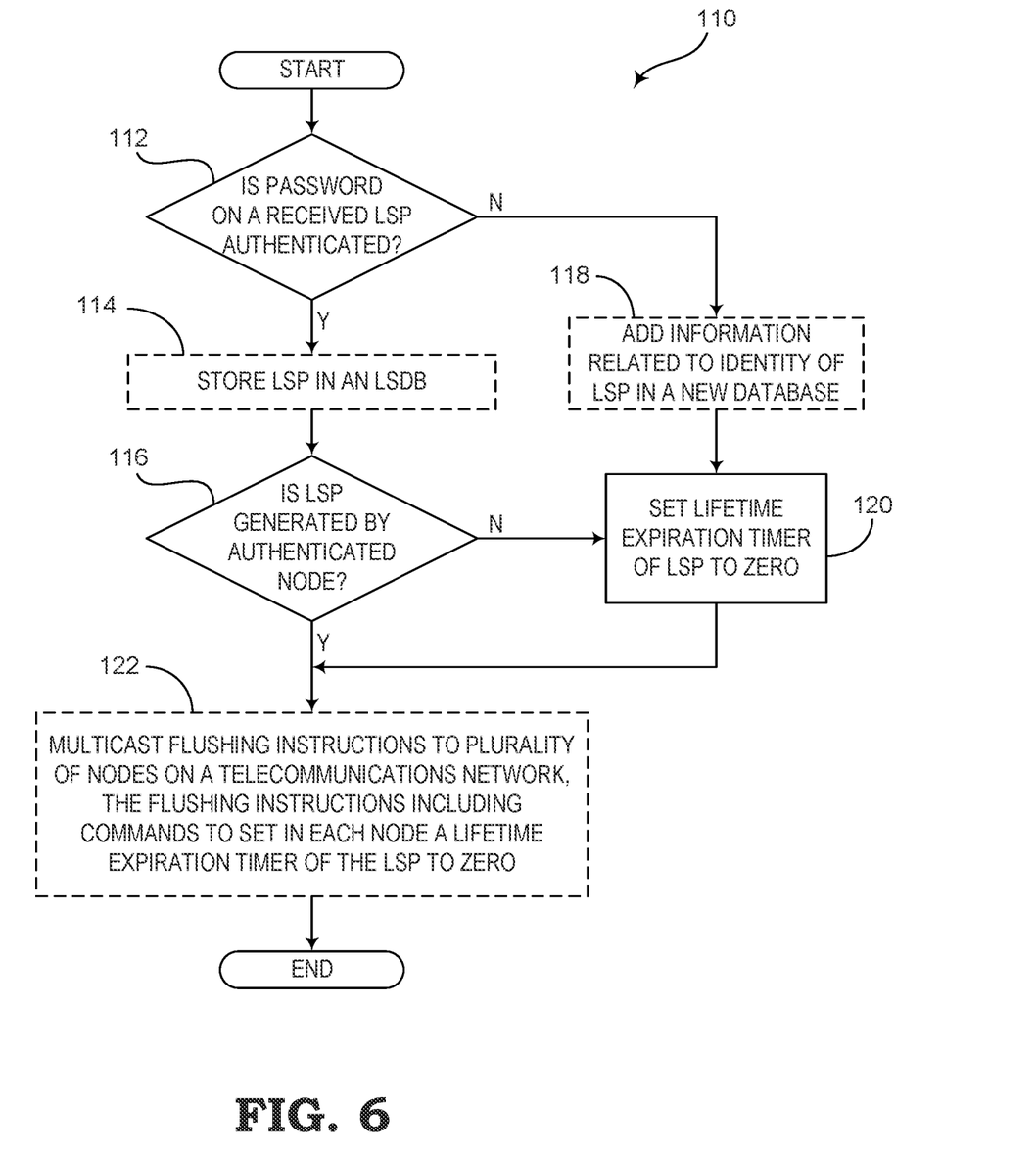
FIG. 6 is a flow diagram showing another method for executing the IS-IS add-on program of FIG. 3, according to various embodiments.

FIG. 6 is a flow diagram illustrating a method 110 according to another embodiment. As shown in this generalized embodiment, the method 110 may simply include steps indicated by blocks 112, 116, and 120. In some embodiments, the steps indicated in the other blocks 114, 118, 122 (shown as dashed lines) may also be executed.

The method 110 may include a decision diamond 112, which includes determining if a password on a received LSP is authenticated. If not, the method 110 goes to optional block 118 or may skip block 118 and go to block 120. If the password is determined to be authenticated in decision diamond 112, the method may proceed to optional block 114 or may skip block 114 and go to decision diamond 116.

According to block 114, the method 110 includes the step of storing the LSP in an LSDB (i.e., LSP database). The method 110 also includes the step of determining if the LSP is generated by an authenticated node, as indicated in decision diamond 116. If so, the method 110 may proceed to optional block 122 or skip block 122 and end. Otherwise, if it is determined that the LSP not generated by an authenticated node in decision diamond 116, the method 110 is diverted to block 120.

Block 118 includes the step of adding information related to an identity of the LSP in a new database, which may be different from the LSDB. After this step, the method 110 proceeds to block 120, which includes the step of setting a lifetime expiration timer of the LSP to zero. Block 122 includes the step of multicasting flushing instructions to a plurality of nodes on a telecommunications network, the flushing instructions including commands to set the respective node's lifetime expiration timer associated with the LSP to zero.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium configured for storing a program that is executable by a processing device in a node, the program enabling the processing device to:
receive a packet from a first peer device on a network,
determine whether a mismatch exists in an authentication of the packet from the first peer device, and
responsive to the authentication mismatch, send a flush instruction to a plurality of peer devices on the network to remove any link state packets from the first peer device at the plurality of peer devices by resetting a lifetime expiration of the link state packets from the first peer device to zero at the plurality of peer devices, and send blocking instructions to the plurality of peer devices to block future packets destined for the first peer device.

2. The non-transitory computer-readable medium of claim 1, wherein the authentication includes area authentication.

3. The non-transitory computer-readable medium of claim 1, wherein the authentication includes domain authentication.

4. The non-transitory computer-readable medium of claim 1, wherein the plurality of peer devices are configured to remove all link state packets from the first peer device regardless of a type of authentication and a type of mismatch.

5. The non-transitory computer-readable medium of claim 1, wherein the program is an add-on to the Intermediate System to Intermediate System (IS-IS) routing protocol.

6. The non-transitory computer-readable medium of claim 1, wherein the program further enables the processing device to determine the mismatch by analyzing a password of the packet to determine if the password matches a set password shared by the plurality of peer devices.

7. A node comprising circuitry configured to:
receive a packet from a first peer device on a network,
determine whether a mismatch exists in an authentication of the packet from the first peer device, and
responsive to the authentication mismatch, send a flush instruction to a plurality of peer devices on the network to remove any link state packets from the first peer device at the plurality of peer devices by resetting a lifetime expiration of the link state packets from the first peer device to zero at the plurality of peer devices, and send blocking instructions to the plurality of peer devices to block future packets destined for the first peer device.

8. The node of claim 7, wherein the authentication includes area authentication.

9. The node of claim 7, wherein the authentication includes domain authentication.

10. The node of claim 7, wherein the plurality of peer devices are configured to remove all link state packets from the first peer device regardless of a type of authentication and a type of mismatch.

11. The node of claim 7, wherein the program is an add-on to the Intermediate System to Intermediate System (IS-IS) routing protocol.

12. The node of claim 7, wherein the circuitry is further configured to determine the mismatch by analyzing a password of the packet to determine if the password matches a set password shared by the plurality of peer devices.

13. A method comprising:
receiving a packet from a first peer device on a network;
determining whether a mismatch exists in an authentication of the packet from the first peer device; and
responsive to the authentication mismatch, sending a flush instruction to a plurality of peer devices on the network to remove any link state packets from the first peer device at the plurality of peer devices by resetting a lifetime expiration of the link state packets from the first peer device to zero at the plurality of peer devices, and sending blocking instructions to the plurality of peer devices to block future packets destined for the first peer device.

14. The method of claim 13, wherein the authentication includes area authentication.

15. The method of claim 13, wherein the authentication includes domain authentication.

16. The method of claim 13, wherein the plurality of peer devices are configured to remove all link state packets from the first peer device regardless of a type of authentication and a type of mismatch.

17. The method of claim 13, wherein the method is implemented as an add-on to the Intermediate System to Intermediate System (IS-IS) routing protocol.

\* \* \* \* \*